United States Patent [19]

Yang et al.

[11] Patent Number: 5,056,551
[45] Date of Patent: Oct. 15, 1991

[54] FAST ACTING MULTIPLE ELEMENT VALVE

[75] Inventors: Jefferson Y. S. Yang, Orange; James M. Wada, Torrance, both of Calif.

[73] Assignee: Eaton Corporation, Cleveland, Ohio

[21] Appl. No.: 394,989

[22] Filed: Aug. 17, 1989

[51] Int. Cl.⁵ .............................................. F16K 3/26
[52] U.S. Cl. ................................ 137/315; 137/454.2; 137/554; 137/599; 137/625.38
[58] Field of Search ..................... 137/315, 454.2, 554, 137/599, 601, 625.38

[56] References Cited

U.S. PATENT DOCUMENTS

| | | | |
|---|---|---|---|
| 3,256,905 | 6/1966 | Griswold et al. | 137/454.2 |
| 3,875,964 | 4/1975 | Friedland | 137/599 |
| 3,994,315 | 11/1976 | Muller et al. | 137/601 |
| 4,842,017 | 6/1989 | Reynolds | 137/601 |

*Primary Examiner*—Stephen M. Hepperle
*Attorney, Agent, or Firm*—L. G. Vande Zande

[57] ABSTRACT

A plurality of slide valve elements having plural axial-spaced annular parts and an internal slide are inserted into a bulkhead in a fluid conduit from a downstream side of the bulkhead, locked in place by a bayonet coupling and set screw, and project through the bulkhead into the upstream conduit. Pneumatic lines connecting the slide valve element actuator to pilot valves are brought out the throat of the valve element to the downstream side. Pilot valves are radially spaced around the exterior of the valve to permit the pneumatic lines to be made identical, thereby to minimize adverse timing tolerances in operation due to pressure variations. Ring manifolds surround the valve adjacent respective pilot valve arrangements to further reduce adverse timing tolerances due to pressure variations, the manifolds being directly connected to the respective pilot valves. Position sensors are provided the valve element slides to signal the precise time at which a slide reaches or passes through a particular point in its stroke to initiate a calibrated timing function.

20 Claims, 6 Drawing Sheets

FAST ACTING MULTIPLE ELEMENT VALVE

The U.S. Government has a paid-up license in this invention and the right in limited circumstances to require the patent owner to license others on reasonable terms as provided for by the terms of contract No. C88-101878 awarded by DOE.

BACKGROUND OF THE INVENTION

This invention relates to apparatus for controlling the flow of a large volume of high pressure, high temperature fluid such as a gas. Particularly, it relates to a valve structure which is fast acting and capable of precise control to provide selected flow rate profiles. More particularly, the invention relates to a valve structure of the afore-described type which utilizes a multiplicity of few distinct components, is easily assembled and maintained, and may be readily controlled with a high degree of precision.

Valve structures of the type disclosed herein have particular utility in wind tunnel applications wherein the shock wave formation of an explosion is replicated. The valve structure should be capable of controlling fluid flow to provide a fast response, instantaneous maximum flow rate representing an initial shock wave and to provide a controlled closing to represent trailing shock waves. Wind tunnels for conducting tests utilizing replicated shock waves are necessarily large to accommodate apparatus to be tested. Therefore, the volume of fluid to be controlled is large and consequently, the valve structure itself is large. In order to achieve the desired magnitude of shock wave, it is contemplated that the wind tunnel be supplied with high pressure, high temperature fluid from plural, parallel sources and that multiple valve structures of the type disclosed herein be provided, one for each fluid supply. Generally, large size and multiplicity contravene fast operation and precision control.

U.S. Pat. No. 3,875,964 issued Apr. 8, 1975 to Harry Friedland discloses a valve structure of the type to which this invention is related. This patent discloses valve elements bolted directly to flanges on a plurality of pipes permanently embedded in a concrete bulkhead. The pipes and the corresponding valve element are of three sizes, the largest being many times the size of the smallest. This size differential impacts the operational speed of the various valve elements, the larger valves operating slower than the smaller valves, and makes precision timing in the control more difficult. The movable slide of the valve element is external to the valve body, and therefore subjected to the high pressure in the system being controlled. Closure of the valves occurs under spring pressure when an actuating force is removed.

SUMMARY OF THE INVENTION

This invention provides a fast acting multiple element valve for precisely controlling a large volume of high pressure, high temperature fluid. The valve structure comprises a bulkhead having an array of holes extending therethrough into which are inserted a plurality of slide valve elements which project beyond the upstream side of the bulkhead into an upstream conduit directly attached to the bulkhead. The bulkhead and valve elements are provided with a bayonet coupling structure whereby the valve elements are locked in place by a partial rotation after insertion in the respective openings and are secured against subsequent rotation by screws in a downstream flange of the valve element engaging the bulkhead. Valve element actuators are integral with the valve at an upstream end thereof and connections to the actuator are made through the throat of the valve to the downstream side of the bulkhead. The valve element actuators are controlled by a pair of solenoid operated pneumatic pilot valves for each valve element, one controlling opening of the valve element and the other controlling closing of the valve element. The pilot control valves are mounted radially along an exterior surface of a cylindrical wall of the bulkhead in annular ring arrangements wherein ON pilot control valves are in one ring and OFF pilot control valves are in a second ring. A pair of pneumatic supply manifolds are annularly disposed around the exterior of the cylindrical wall of the bulkhead adjacent the respective rings of pilot control valves and are directly connected with the individual valves to make uniform the pneumatic supply to each pilot control valve and therefore to the respective valve element. The pilot control valves are pneumatically connected to the actuator elements by lines extending through the cylindrical wall of the bulkhead and connecting to lines extending out through the throat of the valve element at the downstream side thereof. The radial location of the respective pilot control valves for each valve element is selected to maintain the connecting lines for both the ON and the OFF control function of the respective valve element substantially identical in length and shape to minimize any differential in pressure between the two control functions. A position sensor is provided for each valve element comprising a rod mechanically attached to the valve element slide carrying a permanent magnet into and out of proximity with an inductive proximity device to signal slide position during its travel, thereby indicating to a master control device the precise time at which such position was attained. The sensor is mounted directly to the respective valve element from the downstream side of the valve element. Accordingly, all installation and maintenance of the multiple element valve structure constructed according to this invention is accomplished from a downstream side of the bulkhead. The foregoing and other features and advantages of this invention will become more apparent and thoroughly understood when reading the following description and claims in conjunction with the accompanying drawings.

DESCRIPTION OF THE PREFERRED EMBODIMENT

Figure 1:
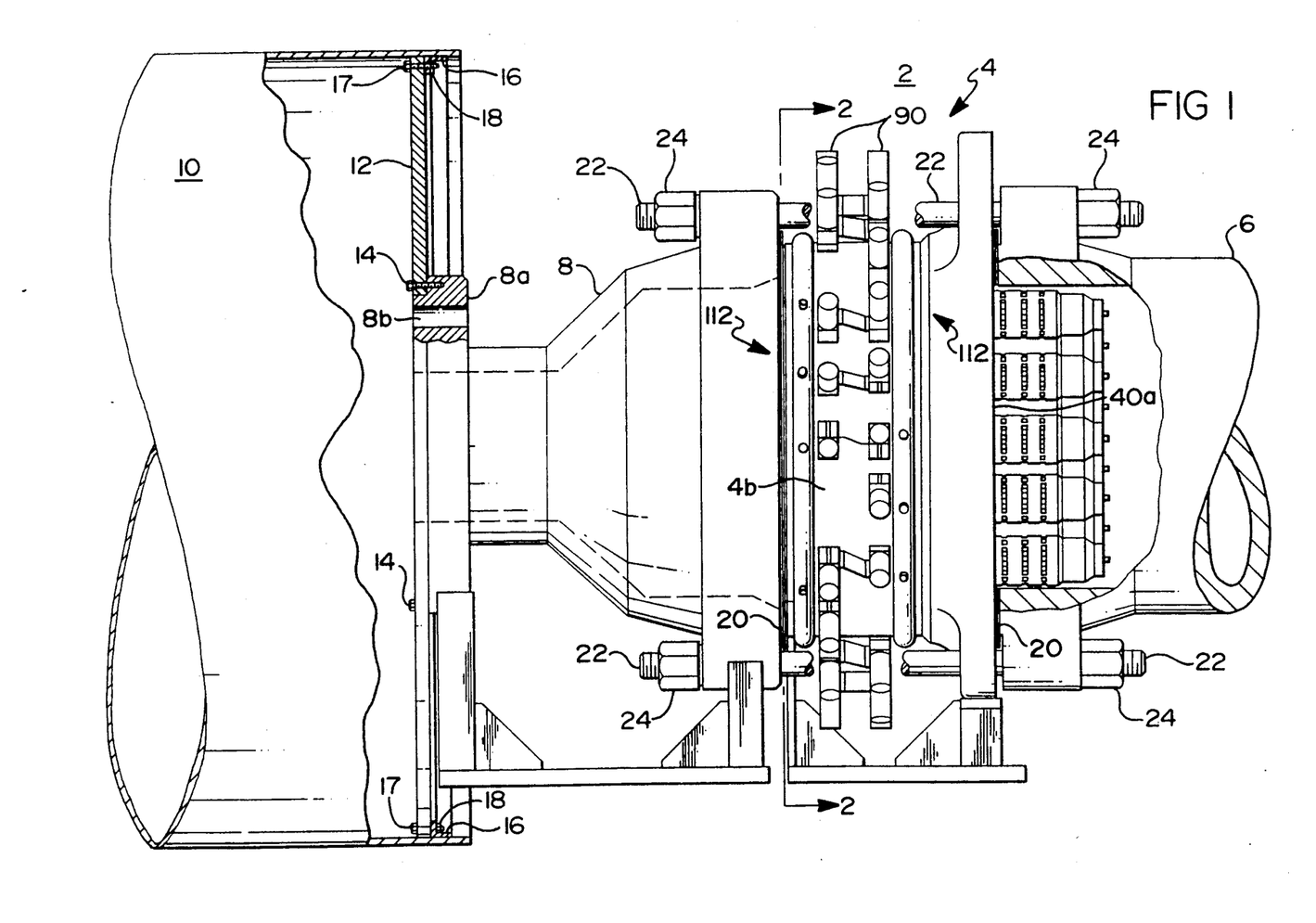
FIG. 1 is a side elevational view of a fast acting multiple element valve constructed in accordance with this invention having an upstream driver tube connected thereto and partially broken away to show portions of individual valve elements extending within the driver tube, and further showing an adapter connected to the downstream side and a downstream shock tube connected to the adapter.

The fast acting multiple element valve 2 of this invention is shown in elevation in FIG. 1. Valve 2 is built upon a wheel-like bulkhead 4 which is preferably made of a corrosion resistant steel. Bulkhead 4 comprises an upright wall or hub 4a (FIGS. 2 and 3) and a cylindrical drum 4b projecting leftward, or downstream, from hub 4a in FIGS. 1 and 3. An upstream conduit 6 is abutted against an upstream surface of bulkhead 4 at the right-hand side of hub 4a as viewed in FIGS. 1 and 3. A downstream conduit is attached to the left-hand side of bulkhead 4 abutting an end surface of the drum 4b. The downstream conduit comprises an adapter 8 which directly abuts the end of drum 4b and a large diameter pipe 10 which is attached to adapter 8. Adapter 8 has a converging configuration in the downstream direction, terminating in a flange 8a to which a circular sealing plate 12 is attached by screws 14 which thread into a ring of tapped holes in flange 8a. A pair of angle iron half circle segments 16 are secured to the interior of pipe 10 near its upstream end by suitable fastening means such as welding, bolting, a combination thereof or other suitable means. Screws 17 and nuts 18 secure the sealing plate 12 to pipe 10 at the outer periphery of the plate. Adapter 8 is provided with a ring of large diameter holes 8b (only one shown in FIG. 1) inside the ring of tapped holes for screws 14, the holes 8b serving as mounting holes for attaching a burst disc retainer if it is desired to use a burst disc in conjunction with the fast acting multiple element valve of this invention. Holes 8b are omitted when a burst disc is not desired.

Figure 2:
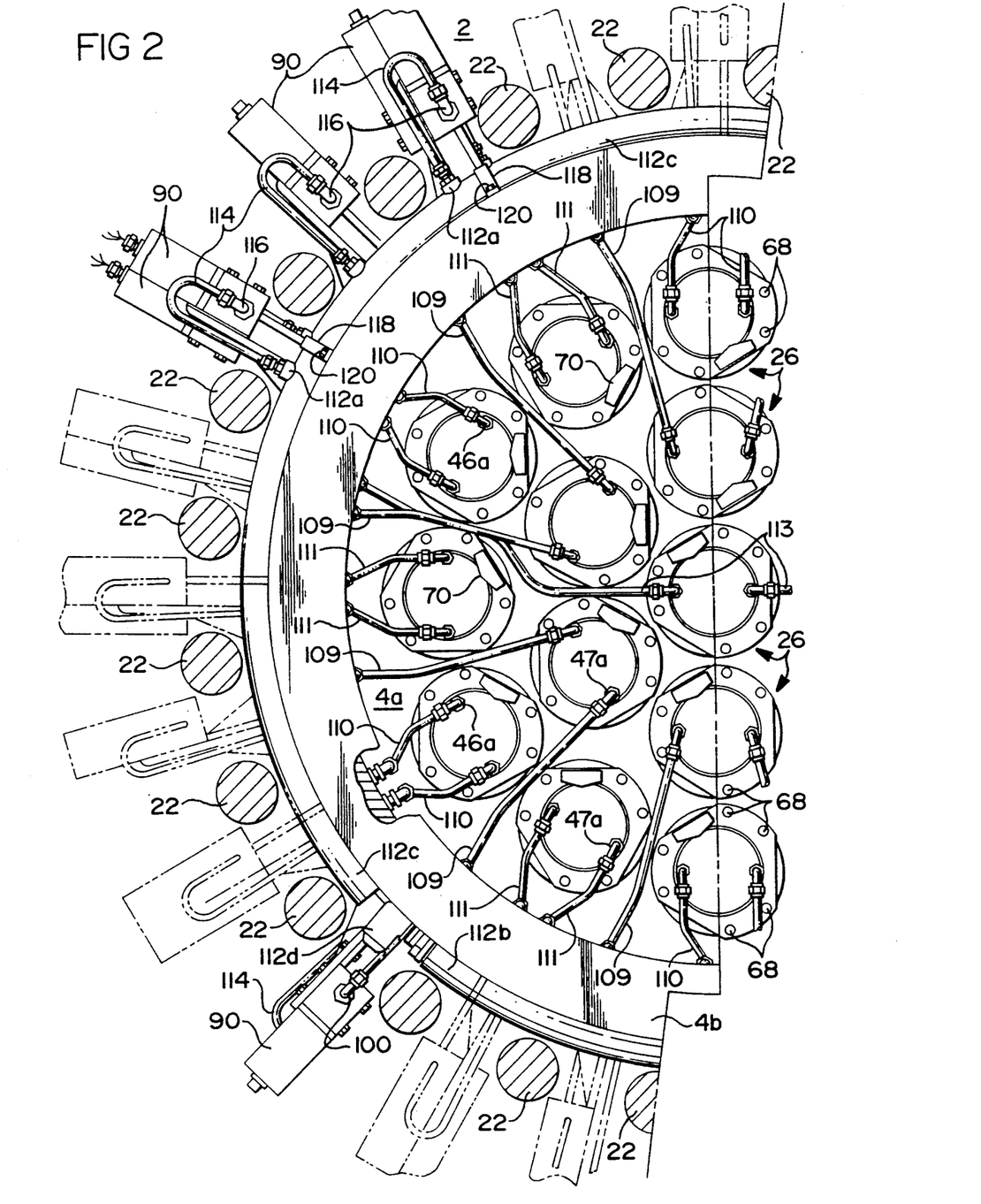
FIG. 2 is a cross sectional view taken along the line 2—2 in FIG. 1 drawn to a greater scale, but showing only one-half the full diameter of the valve of FIG. 1, looking in at the downstream side of the valve.
Figure 3:
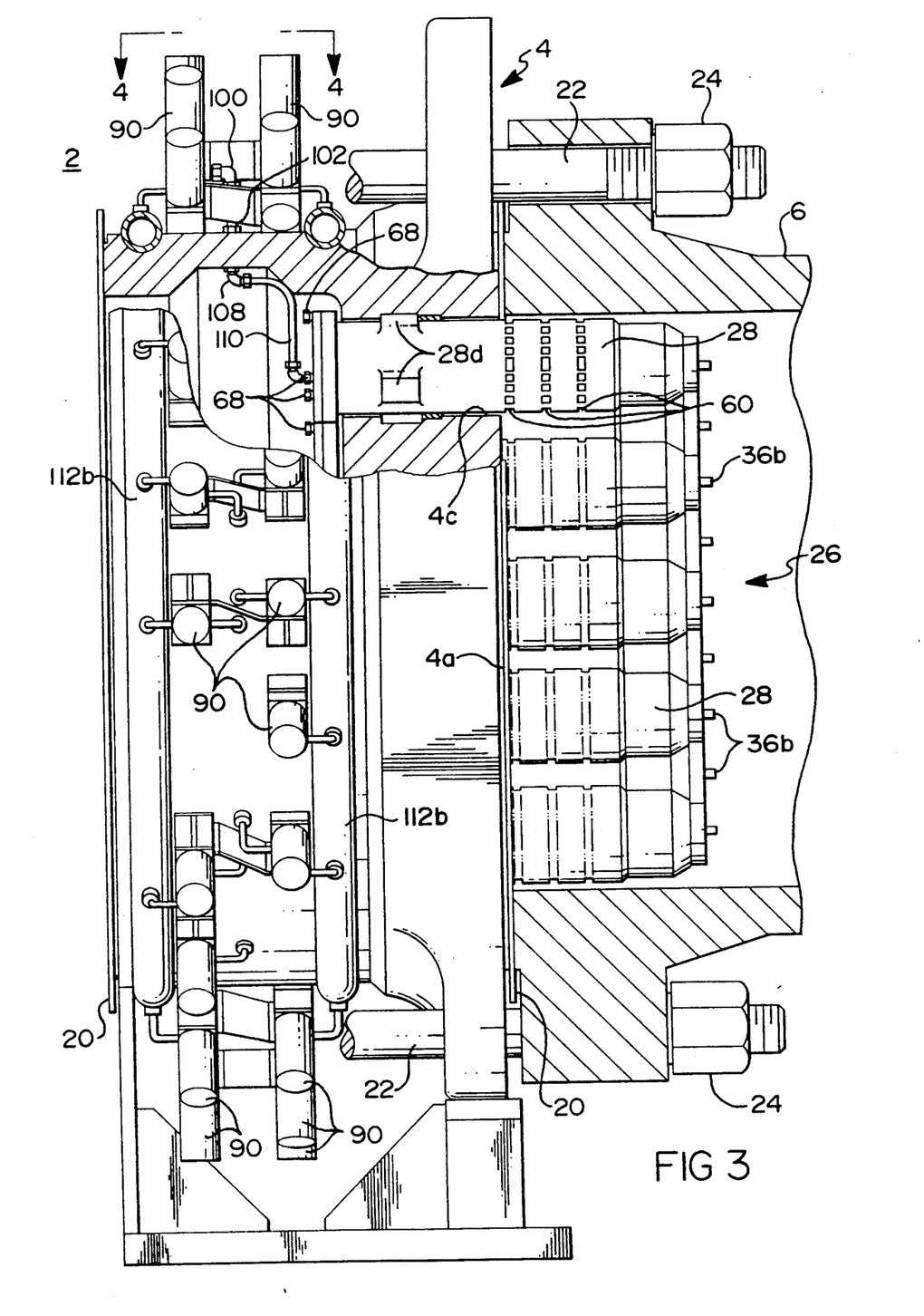
FIG. 3 is a side elevational view of the valve of this invention similar to FIG. 1, but drawn to a greater scale, showing part of the valve bulkhead broken away and the upstream driver tube attached thereto shown in center line section.

Downstream pipe 10 may lead to a larger diameter wind tunnel or may itself be a small wind tunnel or shock tube. For large scale applications, it is contemplated that several upstream conduits 6 and multiple element valves 2 would be employed in parallel to properly supply a downstream wind tunnel. A pair of flat annular gaskets 20 are disposed between the mating surfaces of upstream conduit 6 with bulkhead 4 and of adapter 8 with bulkhead 4. The entire assembly of bulkhead 4, upstream conduit 6 and downstream adapter 8 is held clamped together by a plurality of screws 22 and nuts 24 as shown in FIGS. 1-3. Upstream conduit 6 and adapter 8 are provided with annular flanges having a plurality of openings through which the bolts 22 extend.

Nuts 24 are secured on each end of the bolts 22 and are tightened thereon to draw the conduit 6 and adapter 8 tightly against the respective faces of bulkhead 4. As seen in FIG. 2, many screws 22 are provided at closely spaced radial intervals to maintain the assembly connected together, although only single screws at the top and bottom have been shown in FIGS. 1 and 2 for purposes of clarity in illustrating other features of the valve.

Figure 8:
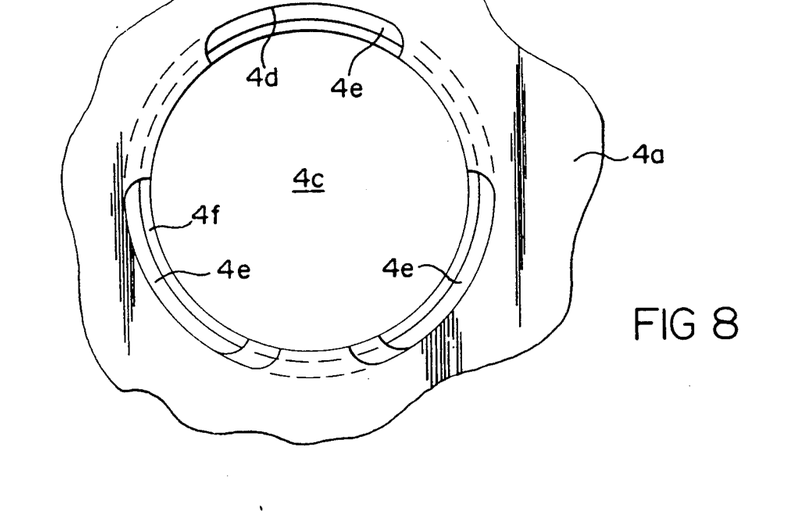
FIG. 8 is a fragmentary view of a downstream face of the bulkhead showing an opening into which the individual valve element, such as shown in FIG. 6, is insertable.

Referring to FIG. 2 wherein one-half of the cross sectional view of the valve 2 and bulkhead 4 are shown, an array of twelve individual valve elements 26 are shown inserted in openings in hub 4a of bulkhead 4. One of such openings 4c is shown in the fragmentary view, FIG. 8, when viewing the opening from the downstream side of hub 4a. Opening 4c has an undercut diameter 4d spaced inwardly from the downstream surface of hub 4a. The hub 4a is provided with three equally spaced slots 4e around the periphery of opening 4c extending between the downstream surface of hub 4a and the undercut diameter 4d. Notches 4e cooperate with tabs formed on the valve body of the individual valve element, as will be described hereinafter, to provide a bayonet coupling between the valve body and the bulkhead 4. The opening 4c is also provided with a second undercut diameter 4f extending further inward from undercut diameter 4d to position a sealing ring as will also be described hereinafter. Nineteen openings 4c and the associated undercuts 4d, 4f and slots 4e are formed in hub 4a in an array as shown by the position of valve 26 in FIG. 2 wherein the missing portion to the right of the center line is a mirror image of the illustrated portion to the left of the center line.

Figures 5, 6:
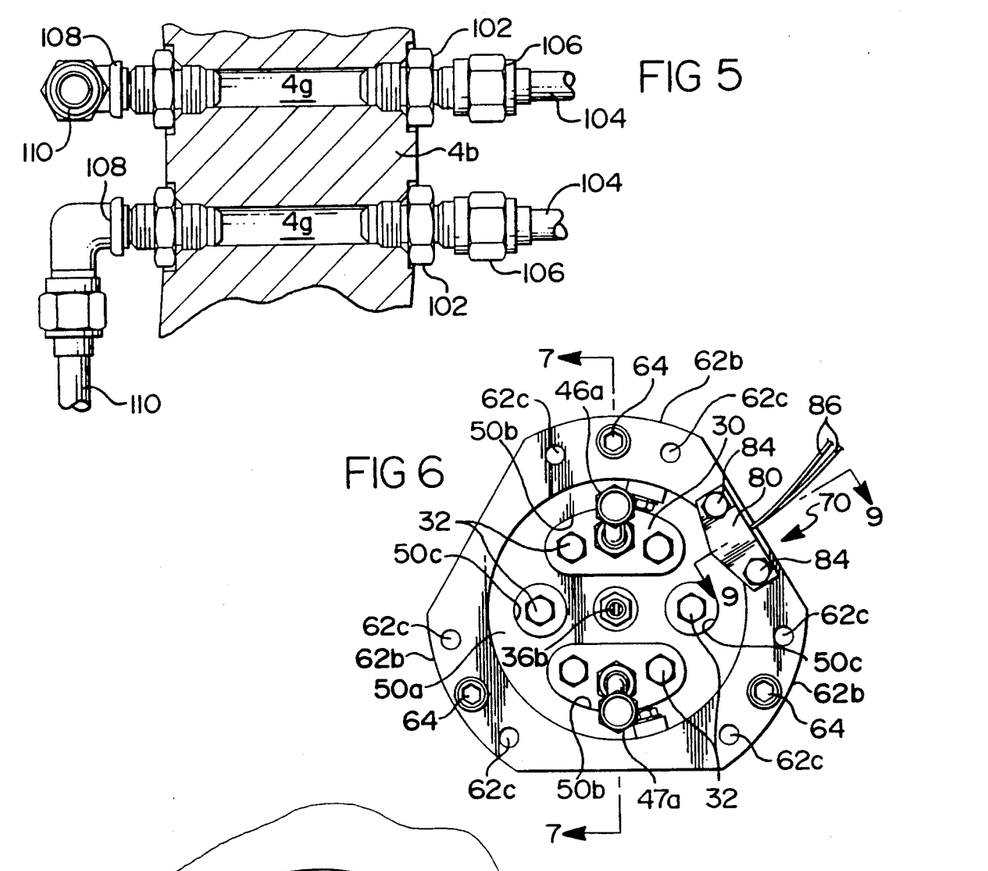
FIG. 5 is a cross sectional view taken along the line 5—5 in FIG. 4 showing the pneumatic connections as they extend through a wall of the valve bulkhead.
FIG. 6 is a downstream end view of an individual valve element of the valve of this invention.
Figures 7, 9:
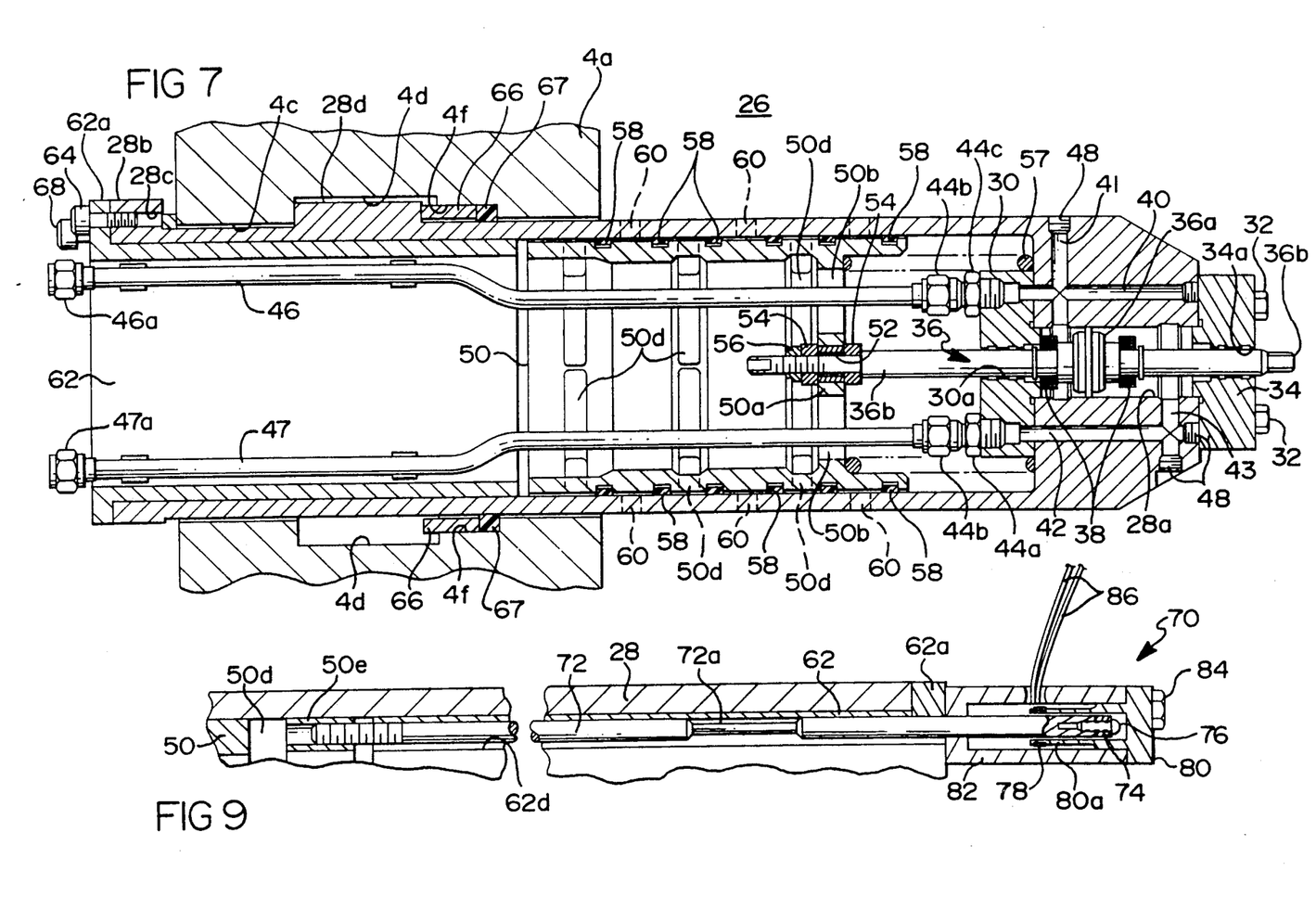
FIG. 7 is a transverse cross sectional view of the valve element taken along the line 7—7 in FIG. 6 showing a fragment of the bulkhead structure in cross-section.
FIG. 9 is a fragmentary sectional view taken along the line 9—9 in FIG. 6 showing a valve slide position indicator.

An individual valve element 26 of valve structure 2 is shown specifically in FIGS. 6 and 7. Valve element 26 comprises a cylindrical valve body 28 also made of a corrosion resistant steel open at the downstream end and constricted at the upstream end to define a small diameter chamber 28a which is closed off by a stop block 30 attached to the interior of the valve body by screws 32 (FIG. 6) and an end plate 34 secured to the exterior upstream end of valve body 28 by additional screws 32 (FIG. 7). Stop block 30 and end plate 32 have axially aligned openings 30a and 34a which serve as bearing surfaces for guiding an axially disposed piston assembly 36 comprising a piston element 36a disposed within chamber 28a and having an axially disposed rod 36b extending in opposite directions therefrom. Two stacks of Belleville spring washers 38 arranged in alternate opposite disposition, front-to-front, back-to-back, are provided on opposite sides of piston element 36a to compress against an annular shoulder on piston rod 36b and a surface of stop block 30 or end plate 34 to cushion the impact as the piston 36a reaches its extremes of axial travel.

With reference to FIG. 7, stop block 30 and the upstream end of valve body 28 have an aligned passage 40 machined therein. A second passage 41 is machined in the upstream end of valve body 28 at right angles to the passage 40 to intersect the passage 40 and communicate with the chamber 28a. A similar set of intersecting passages 42 and 43 are also provided in stop block 30 and valve body 28, the passage 43 extending into chamber 28a near the upstream end thereof. Passages 40 and 42 in stop block 30 are counter-bored and internally threaded at the downstream surface of stop block 30 to receive a two-part coupling 44a, 44b which connect tubes 46, 47 to the passages 40, 42, respectively. The external ends of passages 40-43 are internally threaded at the point at which the exit the valve body 28 and are sealed by plugs 48 which are threaded into valve body 28.

Valve element 26 further comprises a cylindrical slide 50 having an outside diameter which closely conforms to the inside diameter of cylindrical valve body 26. Slide 50 is a hollow cylinder with a hub 50a formed near the righthand end thereof as viewed in FIG. 7. Hub 50a has an axial hole therethrough which receives a reduced diameter threaded shank of piston rod 36b. A loosely toleranced fit is provided between a bushing 52 provided in the hole in hub 50a and the shank of piston rod 36b and by external thrust washers 54 located on piston rod 36b on either side of hub 50a, all held in place by a locking nut 56. These elements provide a gimballed connection of piston rod 36b to slide 50 which thereby accepts any misalignment between the piston rod and slide. A helical compression spring 57 (FIG. 7) is disposed around stop block 30 between the downstream interior end face of valve body 28 and the hub 50a of slide 50 to bias slide 50 to the OFF position in a fail-safe mode in the absence of control pressure to the tubes 46 or 47. Hub 50a is also provided with oblong openings 50b (see particularly FIG. 6) which each provide access to two of the screws 32 and clearance for tubes 46 and 47 to extend therethrough. As seen in FIG. 6, circular openings 50c are provided along the horizontal center line of valve element 26 to provide access for the remaining two screws 32 which hold stop block 30 to the interior of valve body 26.

Slide 50 is provided with three axially spaced ports 50d, each of which comprise annular rings of multiple openings through the side wall of slide 50. The external surface of slide 50 is provided with six axially spaced annular grooves which receive piston ring type seals 58 therein for contact with the interior diameter of valve body 26. Valve body 28 is provided with three axially spaced ports 60, each of which comprise an annular ring of plural openings through the side wall of valve body 26. The ports 60 and 50d are so arranged on their respective members that they are coincidentally aligned when the piston 36a is driven to its upstream position which is to the right as viewed in FIG. 7. It will be noted that the piston ring type seals 58 are disposed in pairs on opposite sides of the ports 60 when the piston 36a is in its downstream position such as illustrated in FIG. 7 to seal at both sides of the external ports 60 in valve body 28. Moreover, the axial dimension of ports 50d and 60 and the axial spacing between these ports before overlap occurs requires significant valve opening movement whereby slide 50 is at full velocity at the time overlapping and consequent opening of the valve begins such that the valve opens very abruptly.

A liner sleeve 62 is inserted in the open end of valve element 26, the sleeve having an external flange 62a at a downstream end thereof. Valve body 28 has a corresponding flange 28b (FIG. 7) at the downstream end of the valve body. The two flanges are flattened at three equally spaced segments of the diameter to define three equally spaced lobes such as shown at 62b in FIG. 6. Each lobe of the respective flange has three arcuately spaced holes such as 62c (FIG. 6) and aligned corresponding holes 28c in valve body 28 (FIG. 7). Holes 28c are threaded whereas holes 62c are clearance holes for the shank of cap screws 64 shown in FIG. 6 which are used to attach the liner 62 to valve body 28.

Valve body 28 is provided with three equal angularly spaced radially extending tabs 28d which pass through slots 4e when a respective valve element 26 is inserted into a respective hole 4c in bulkhead 4 from the downstream side. Prior to such insertion however seal 67 and a backup ring 66 are inserted in the opening 4c to be received in the undercut 4f. The upstream end of tabs 28d abut backup ring 66 to compress seal 67, thereby providing a seal between bulkhead 4 and valve body 28. When tabs 28d become aligned with undercut diameter 4d, the valve body may be rotated a partial revolution such that the tabs 28d now engage the annular shoulder formed by the undercut diameter 4d between the sots 4e. Thus a solid metal-to-metal fit is provided between the valve element 26 and bulkhead 4 to prevent the valve element from blowing out in the downstream direction, but which enables the valve element to be rotated a partial turn and then readily removed for maintenance. A plurality of cap screws 68 (FIG. 2) similar to cap screws 64 but having longer shanks thereon extend through the holes 62c on either side of cap screws 64 and threadably extend through the corresponding holes 28c to bear against the downstream surface of hub 4a, thereby drawing the downstream edge of the respective tabs 28d of valve body 28 firmly into engagement with the annular shoulder formed by the undercut diameter 4d and firmly locking the valve body 28 to the bulkhead to prevent rotation thereof in a direction which would enable the bayonet coupling to be released.

Valve element 26 is provided with a slide position indicator 70 as best shown in FIG. 9. The downstream end of cylindrical slide 50 is provided with a threaded insert 50e into which is threaded a long cylindrical rod 72 to project in the axial direction from the downstream face of slide 50. Rod 72 has a hexagonal configuration 72a intermediate its ends to facilitate threading the rod into insert 50e. Liner sleeve 62 has a groove 62d formed on its interior face over the length thereof into which rod 72 is disposed for reciprocating axial movement. Rod 72 projects beyond the downstream end of valve body 28 and liner sleeve flange 62a and has a cylindrical permanent magnet 74 affixed to its end by a screw 76. An inductive sensor such as a Hall Effect Device (HED) 78 is mounted on a tubular projection 80a of an end cap 80 for a protective housing 82. The tubular projection 80a is disposed over the end of rod 72 and the protective housing 82 and end cap 80 are secured together and to the end of valve body 28 and liner sleeve 62 by a pair of screws 84. In FIG. 9, the slide 50 is illustrated in its extended, or valve closed position such as shown in FIG. 7, and it can be seen that the magnet 74 is positioned well within the tubular projection 80a. When the valve element 26 is operated to its open position whereby slide 50 is withdrawn in the upstream direction to align ports 50d with ports 60, the rod 72 retracts permanent magnet 74 past HED 78 to provide a signal over wires 86 indicating the precise instant at which that specific valve element 26 attained the particular position in its travel. That signal may be utilized for timing purposes in the main control of the valve 2, determining the precise start time of a timing cycle during which that particular valve element 26 is permitted to be opened.

Each valve element 26 is controlled by a pair of solenoid operated two-position, three-way pneumatic pilot valves 90 such as are sold by Circle Seal Controls, Brunswick Corporation, Anaheim, Calif. One pilot valve is connected in the line to the tube 46 which controls opening of the valve element 26 and the other pilot valve 90 is connected to the tube 47 which controls closing of the valve element 26. Pilot valves 90 for all of the valve elements 26 are arranged in a radially spaced pattern in two annular rings around the exterior surface of hub portion 4b of bulkhead 4, the pilot valves which control opening movement being disposed in one ring and those pilot valves which control closing being disposed in the other ring. A plurality of brackets 92 are attached to the exterior surface of drum 4b by pairs of screws 94 and the respective pilot valves 90 are attached to an upstanding leg of a respective bracket 92 by screws 96 and nuts 98 (FIG. 4).

Each pilot valve 90 has an output fitting 90a to which is attached a 90° elbow fitting 100 (FIG. 4) which in turn is coupled to a fitting 102 (FIG. 5) screwed into the end of a through passage 4g in drum 4b of bulkhead 4 by a short tube 104 and a universal coupling 106. A 90° elbow fitting 108 is threaded into the wall of drum 4b at the interior end of the respective passage 4g. Two tubes 110 of identical size and mirror image configuration are connected between the elbows 108 and couplings 46a and 47a on tubes 46 and 47, respectively, of valve element 26. The radial locations of the pilot valves 90 along the exterior surface of drum portion 4b permits the pneumatic control lines, such as 110, for each pilot valve of a respective valve element 26 to be identical, thereby to minimize any variables in operating times between opening and closing operations of the valve. As seen in FIG. 2, tubes 110 connect alternate valve elements 26 disposed in the outer ring of valve elements to their respective pilot valves 90. The remaining valve elements 26 in the outer ring of such elements are connected to their respective pilot valves 90 by tubes 111 which differ from tubes 110 in minor proportion. The intermediate circle of valve elements 26 are connected to their respective pilot valves 90 by tubes 109 of a third size and shape, and the center valve element 26 is connected to its pilot control valves 90 by a fourth distinct size and shape pair of tubes 113 which extend to diametrically opposed locations of the bulkhead. As seen in FIG. 2, the elbows 108 for each valve element 26 are both oriented in the same direction toward the valve, whereas in FIG. 5, the lower elbow 108 is rotated 90° for illustration of the elbow assembly only.

Figure 4:
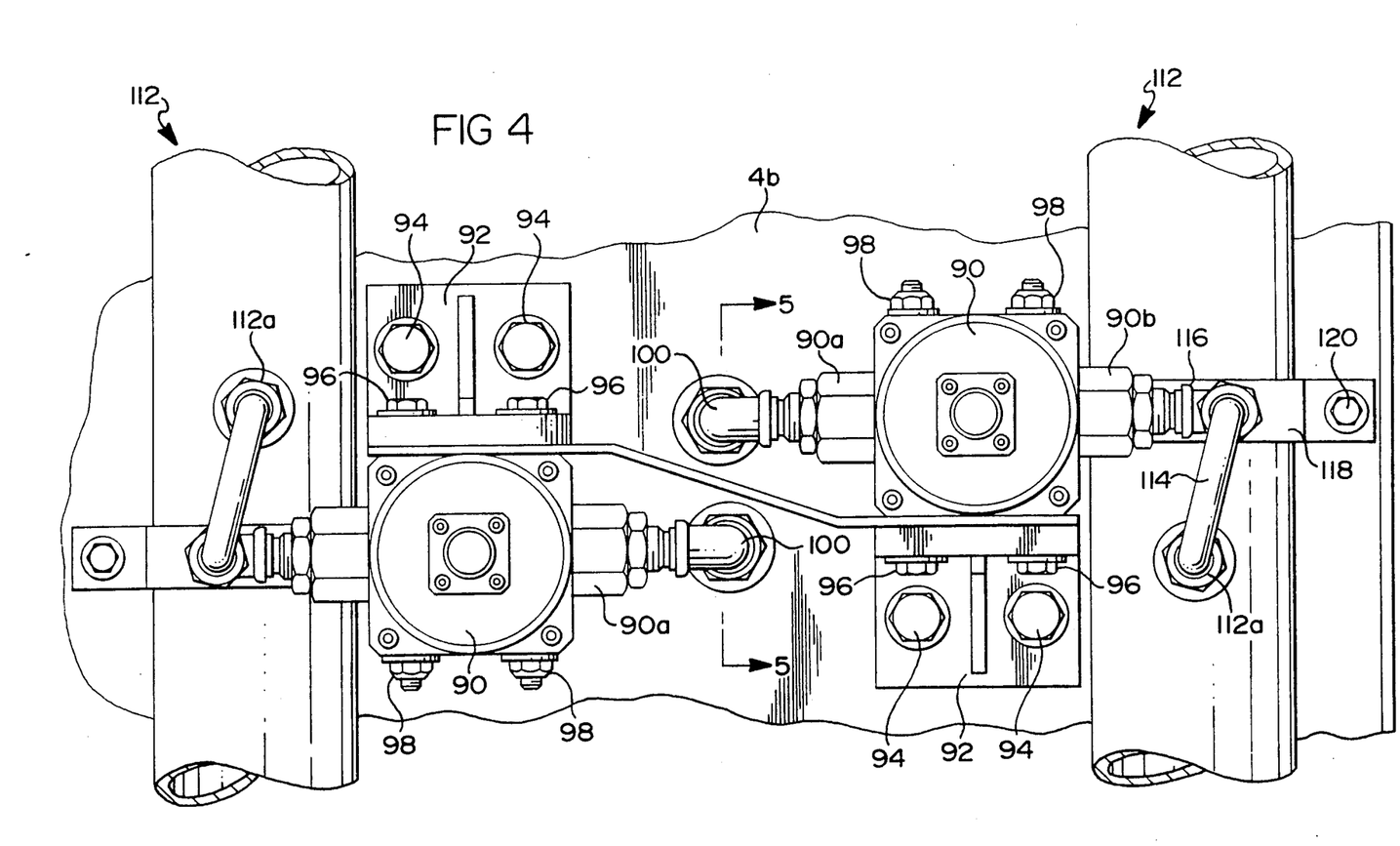
FIG. 4 is a fragmentary view looking in the direction of line 4—4 in FIG. 3, drawn to an enlarged scale, showing a pair of solenoid operated pilot valves and portions of respective supply manifolds as well as pneumatic connections leading to and from the valves.

Pilot valves 90 are connected to a pneumatic supply such as compressed nitrogen by ring shaped supply manifolds 112 which are disposed annularly around drum 4b of bulkhead 4 immediately adjacent a respective ring of "OPEN" or "CLOSE" pilot valve elements 90 as seen in FIGS. 1, 3 and 4. Manifolds 112 have fittings 112a which connect a U-shaped tube 114 to a 90° elbow 116 attached to an inlet fitting 90b of a respective pilot valve 90. The ring manifolds 112 provide an adequate volume of pressurized gas substantially equally distributed throughout the manifold to minimize any variation in pressure supplied to any pilot valve. To further minimize variations in supply pressure, it is preferred that each annular manifold 112 comprise two separate manifolds 112b and 112c (FIG. 2), each extending through an arcuate length of approximately one-half a circle, and each having a fitting 112d for connection to a main supply source. Manifold segments 112b and 112c are secured within annular semicircular recesses in the exterior surface of drum portion 4b by clamps 118 (FIG. 4) overlying the manifold and screws 120 threadably engaging tapped holes in the wall of bulkhead drum portion 4b.

Operation

Multiple element valve 2 is adapted to be controlled by a computer, programmable controller or other form of logic control electrically connected to the solenoids of pilot valves 90 and to the HEDs 78. A maximum valve throat opening is achieved by opening all nineteen valve elements 26 of valve 2 simultaneously, although it is to be understood that fewer than all the elements 26 can be opened, as required. The trailing shock wave profile is attained by closing the valve elements in a prescribed timed rate and sequence as determined through the logic.

To open the valve 2, the solenoids of pilot valves 90 associated with the "OPEN" function are energized to operate the respective pilot valves to connect the pneumatic supply to the left side of piston 36a (FIG. 7), driving the piston to the right to move slide 50 against the bias of spring 57 to align ports 50d with ports 60 of valve body 28, thereby opening the valve elements 26 and the valve 2. As slide 50 moves to the right in FIG. 7, it carries with it rod 72 and permanent magnet 74. HED 78 is positioned at a predetermined location in the travel of slide 50 such that permanent magnet 74 passes HED 78 in motion and causes HED 78 to send a signal to the control logic indicating the precise moment at which the slide of that respective valve element 26 was in the specified portion of its travel to initiate a timing period to that valve element 26, timing the duration of "open" time for that valve element. It is also contemplated that the logic control can be programmed with operation time information of each pilot valve 90 to compensate and calibrate the system for operating characteristic variations in the pilot valves.

As the control logic directs the valve elements to be closed, it deenergizes the solenoid of the "OPEN" pilot valve 90 of a respective valve element 26 and energizes the solenoid of the associated "CLOSE" pilot valve, thereby directing high pressure gas at the right side of piston 36a and connecting the left side of the chamber 28a to atmosphere. This positively drives slide 50 leftward as viewed in FIG. 7 to move the ports 50d out of registration with ports 60 of valve body 28, closing the valve. Spring 57 assists the slide 50 in leftward movement, and will drive the slide 50 in that direction when high pressure is removed from the left-hand side of piston 36a, regardless whether high pressure is applied to the right-hand side of the piston. The "CLOSE" pilot valves 90 are operated in a prescribed timed sequence to correspondingly close the valve elements 26 to provide a desired profile for the wave shape in downstream conduit 10.

The foregoing has described a preferred embodiment of the fast-acting multiple element valve of this invention. This valve is constructed to be particularly easy to assemble and service, to utilize a multiplicity of relatively few distinct parts, and to readily adapt to precise control and operation. Although it has been disclosed in a single embodiment, it is to be understood that it is susceptible of various modifications without departing from the scope of the appended claims.

We claim:

1. A fast acting multiple element valve for controlling a large volume fluid flow comprising:
   a bulkhead having an array of openings therethrough;
   a plurality of valve elements removably inserted into said openings from a downstream side of said bulkhead, portions of said valve elements extending through said bulkhead and projecting from an upstream side thereof;

locking means securing said valve elements to said bulkhead, said locking means being operable from said downstream side of said bulkhead;

an upstream conduit connected to said upstream side of said bulkhead, said upstream conduit enveloping said plurality of valve elements whereby said portions of said valve elements extend into said upstream conduit; and control means operating said valve elements between open and closed positions, said control means comprising separable connections to said valve elements at said downstream side of said bulkhead.

2. The multiple element valve defined in claim 1 wherein said valve elements are identical.

3. The multiple element valve defined in claim 1 wherein said valve elements individually comprise:

a cylindrical body disposed in a respective one of said openings in said bulkhead and projecting from said upstream side of said bulkhead, said body being open at a downstream end thereof, closed at an upstream end thereof, and having apertures in a side wall thereof defining stationary ports;

actuator means disposed in said upstream end of said body comprising a reciprocally movable piston; and a cylindrical slide disposed within said body and connected to said piston, said slide being driven by said piston to open and close said stationary ports.

4. The multiple element valve defined in claim 3 wherein:

said apertures in said body side wall are axially spaced along said side wall; and said slide comprises a cylindrical member open at its downstream end and having apertures in its side wall disposed in coincident registration with said apertures in said body side wall when said slide is in its open position, and said apertures in said body side wall and said slide side wall being fully out of registration when said slide is in its closed position.

5. The multiple element valve defined in claim 4 wherein spacing and size of said apertures in said body side wall and said slide side wall permit substantial movement of said slide before said apertures in said slide begin to overlap corresponding apertures in said body.

6. The multiple element valve defined in claim 5 wherein said apertures in said body and said slide comprise a plurality of apertures arranged in axially spaced annular rings.

7. The multiple element valve defined in claim 1 wherein said locking means comprises a bayonet type coupling comprising complemental slots and tabs in said openings and on said valve elements, said valve element being axially inserted into said opening and subsequently rotated a partial revolution to lock said valve element against axial withdrawal from said downstream side of said bulkhead.

8. The multiple element valve defined in claim 7 wherein said valve element comprises radial projections at a downstream side of said bulkhead carrying screw means operable from said downstream side of said bulkhead to engage said bulkhead and prevent rotation of said valve element.

9. The multiple element valve defined in claim 1 wherein said control means comprises pneumatic means having pilot valves mounted around a periphery of said bulkhead at a downstream side thereof and pneumatic lines connecting said pilot valves to said valve elements, said separable connections to said valve elements at said downstream side of said bulkhead comprising mechanical coupling elements in said pneumatic lines.

10. The multiple element valve defined in claim 3 wherein said control means comprises pneumatic pilot valves disposed around a periphery of said bulkhead at a downstream side thereof, said pilot valves being pneumatically connected to said actuator means of respective valve elements by tubes extending therebetween through said open downstream end of said cylindrical body and through said cylindrical slide.

11. The multiple valve element defined in claim 10 wherein two of said pilot valves are connected to each said actuator, a first pilot valve operable to effect movement of said piston in a valve open direction and a second pilot valve operable to effect movement of said piston in a valve closed direction, said two pilot valves being disposed at selected locations around said periphery wherein respective said tubes connecting said two pilot valves to said actuator means are substantially identical.

12. The multiple element valve defined in claim 11 wherein said tubes each comprise separate sections defining a joint externally of said valve element and said separable connections comprise mechanical coupling elements joining said sections at said joint.

13. The multiple element valve defined in claim 11 wherein said actuator means comprises a rod extending axially in opposite directions from said piston and a plurality of dished spring washers arranged alternately back-to-back and front-to-front on said rod on opposite sides of said piston, said spring washers being compressed by said piston and stop means for said piston to cushion impact of said piston with said stop means.

14. The multiple element valve defined in claim 3 wherein said valve body comprises position detecting means operated by actuating means therefor carried on said slide.

15. The multiple element valve defined in claim 14 wherein said position detecting means comprises an inductive proximity device mounted on said downstream end of said valve element body and said actuating means comprises magnetic means carried on a rod projecting from said slide.

16. A fast acting multiple element valve for controlling a large volume fluid flow comprising:

a bulkhead connected in a fluid flow path between an upstream conduit and a downstream conduit, said bulkhead having an array of openings therethrough communicating between an upstream side and a downstream side of said bulkhead;

a plurality of valve elements removably inserted into said openings from said downstream side of said bulkhead, portions of said valve elements having fluid flow ports extending through said bulkhead into said upstream conduit;

locking means securing said valve elements to said bulkhead, said locking means being operable from said downstream side of said bulkhead;

control means comprising a pair of pneumatic pilot valves for each valve element, said pilot valves effecting operation of said valve element between open and closed positions, said pilot valves being mounted to an exterior wall of said bulkhead outside said fluid flow path;

a pneumatic line connecting a respective one of said pair of pilot valves to said respective valve element through said exterior wall;

said pilot valves being mounted at selected radial locations along said exterior wall wherein the pneumatic lines connecting a valve element to its respective pair of pilot valves are substantially identical.

17. The multiple element valve defined in claim 16 wherein said control means comprises manifold means connected to a pneumatic supply, said manifold means extending along said exterior wall adjacent said selected radial locations and said respective pilot valves being directly connected to said manifold means at respective selected radial locations.

18. The multiple element valve defined in claim 17 wherein:

a first pilot valve of said pair of pilot valves effects movement of said valve element connected therewith to said open position and a second pilot valve of said pair of pilot valves effects movement of said valve element to said closed position; and said manifold means comprises separate manifolds, one of which is adjacent and connected to respective first pilot valves and another of which is adjacent and connected to respective second pilot valves.

19. The multiple element valve defined in claim 18 wherein:

said exterior wall of said bulkhead is cylindrical;

said pilot valves are mounted on said exterior wall in two annular rings, one ring comprising said first pilot valves and another ring comprising said second pilot valves; and said manifolds comprise arcuate tubular members disposed annularly of said exterior wall adjacent a respective ring of pilot valves.

20. The multiple element valve defined in claim 19 wherein each said manifold comprises a pair of separate semi-circular manifolds disposed end-to-end annularly around said exterior wall.

* * * * *